(12) United States Patent
Mistry et al.

(10) Patent No.: US 12,384,219 B2
(45) Date of Patent: Aug. 12, 2025

(54) WHEEL-TO-SURFACE CONTACT PATCH FORCE VARIATION

(71) Applicant: JAGUAR LAND ROVER LIMITED, Warwickshire (GB)

(72) Inventors: Anesh Mistry, Coventry (GB); Luke Birch, Coventry (GB); Sam Brown, Coventry (GB); Dennis Lausecker, Coventry (GB); Syed Asad Ali, Coventry (GB); William Burdock, Coventry (GB); James Kelly, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 267 days.

(21) Appl. No.: 18/254,407

(22) PCT Filed: Nov. 25, 2021

(86) PCT No.: PCT/EP2021/083067
§ 371 (c)(1),
(2) Date: May 25, 2023

(87) PCT Pub. No.: WO2022/112454
PCT Pub. Date: Jun. 2, 2022

(65) Prior Publication Data
US 2024/0010041 A1    Jan. 11, 2024

(30) Foreign Application Priority Data
Nov. 27, 2020   (GB) ...................................... 2018685

(51) Int. Cl.
*B60W 10/22*   (2006.01)
*B60G 17/0165*   (2006.01)
(Continued)

(52) U.S. Cl.
CPC ..... *B60G 17/0195* (2013.01); *B60G 17/0165* (2013.01); *B60W 10/22* (2013.01);
(Continued)

(58) Field of Classification Search
CPC .............. B60G 17/015; B60G 17/0152; B60G 17/0155; B60G 17/0157; B60G 17/016;
(Continued)

(56) References Cited

U.S. PATENT DOCUMENTS 5,606,503 A * 2/1997 Shal ..................... B60G 17/016
                                                              280/124.108
5,797,607 A    8/1998 Kopczynski
(Continued)

FOREIGN PATENT DOCUMENTS

DE   102015217477 A1    3/2017
DE   102019126045 A1   12/2019
(Continued)

OTHER PUBLICATIONS

International Search Report and Written Opinion of the International Searching Authority for International application No. PCT/EP2021/083067 dated May 19, 2022.
(Continued)

*Primary Examiner* — Erick R Solis
(74) *Attorney, Agent, or Firm* — Carlson, Gaskey & Olds, P.C.

(57) ABSTRACT

A control system (300) for controlling an active suspension system (104) of a vehicle (100), the active suspension system comprising suspension actuators (502), the control system comprising one or more controller (301), wherein the control system is configured to: in dependence on an activation signal (904), provide (908) a control signal to the active suspension system to cause the suspension actuators of the active suspension system to repetitively pulse vertical
(Continued)

force through wheels (FR, FL, RR, RL) of the vehicle in a controlled pattern determined by the one or more controller, to vary wheel-to-surface contact patch forces, wherein the pattern comprises repetitively pulsing vertical force through at least one of the wheels at a first phase and through at least one other of the wheels at a second phase.

20 Claims, 5 Drawing Sheets

(51) Int. Cl.
  *B60G 17/018* (2006.01)
  *B60G 17/0195* (2006.01)
  *B60W 40/13* (2012.01)
(52) U.S. Cl.
  CPC .... *B60G 2202/314* (2013.01); *B60G 2202/40* (2013.01); *B60G 2400/102* (2013.01); *B60G 2400/204* (2013.01); *B60G 2400/208* (2013.01); *B60G 2400/252* (2013.01); *B60G 2400/52* (2013.01); *B60G 2400/61* (2013.01); *B60G 2400/91* (2013.01); *B60G 2401/28* (2013.01); *B60G 2500/30* (2013.01); *B60G 2800/182* (2013.01); *B60G 2800/214* (2013.01); *B60G 2800/915* (2013.01); *B60W 2040/1307* (2013.01)
(58) Field of Classification Search
  CPC ............ B60G 17/0161; B60G 17/0165; B60G 17/018; B60G 17/0195; B60G 2202/322; B60G 2202/414; B60G 2400/61; B60G 2400/102; B60G 2400/204; B60G 2400/208; B60G 2800/21; B60G 2800/91; B60G 2800/182; B60G 2800/214; B60G 2800/915; B60W 10/22; B60W 2040/1307
  USPC ...................................................... 701/37–40
  See application file for complete search history.

(56) References Cited

U.S. PATENT DOCUMENTS

| | | | |
|---|---|---|---|
| 6,471,218 B1 | 10/2002 | Burdock et al. | |
| 2014/0265170 A1* | 9/2014 | Giovanardi | F16K 11/065 |
| | | | 280/5.5 |
| 2022/0396111 A1* | 12/2022 | Favalli | B60G 17/01908 |
| 2022/0396112 A1* | 12/2022 | Favalli | B60G 17/0164 |
| 2024/0109385 A1* | 4/2024 | Mistry | B60G 17/0195 |
| 2024/0300275 A1* | 9/2024 | Anderson | H02K 7/14 |

FOREIGN PATENT DOCUMENTS

| | | |
|---|---|---|
| DE | 102020005552 A1 | 10/2020 |
| GB | 2358004 A | 7/2001 |

OTHER PUBLICATIONS

Combined Search and Examination Report under Sections 17 and 18(3) for Application No. GB2018685.4 dated Aug. 18, 2021.

* cited by examiner

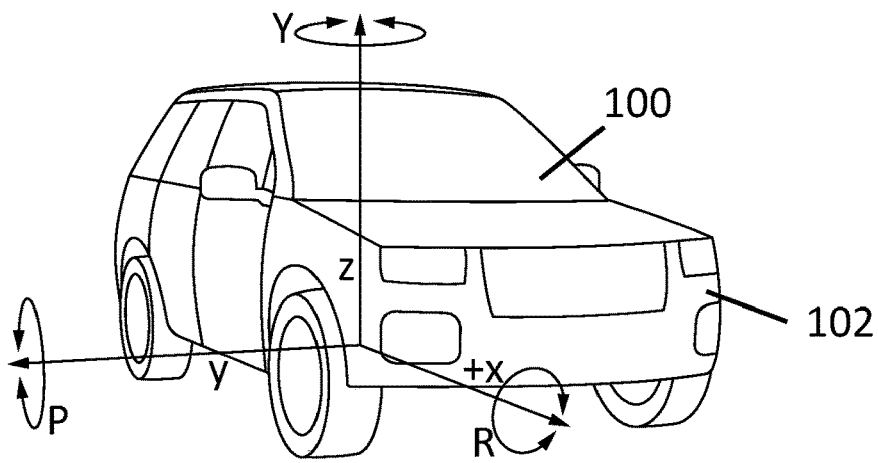
FIG. 1
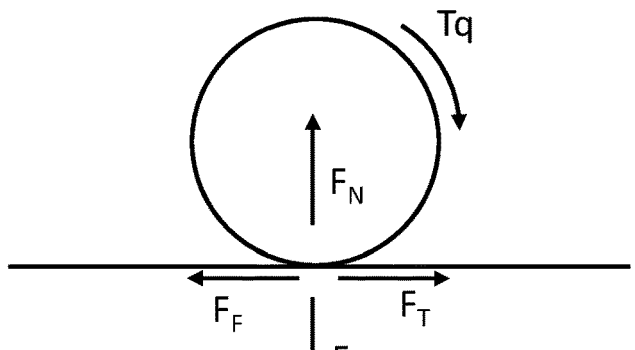
FIG. 2A
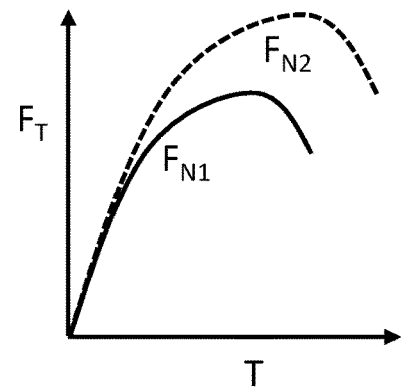
FIG. 2B
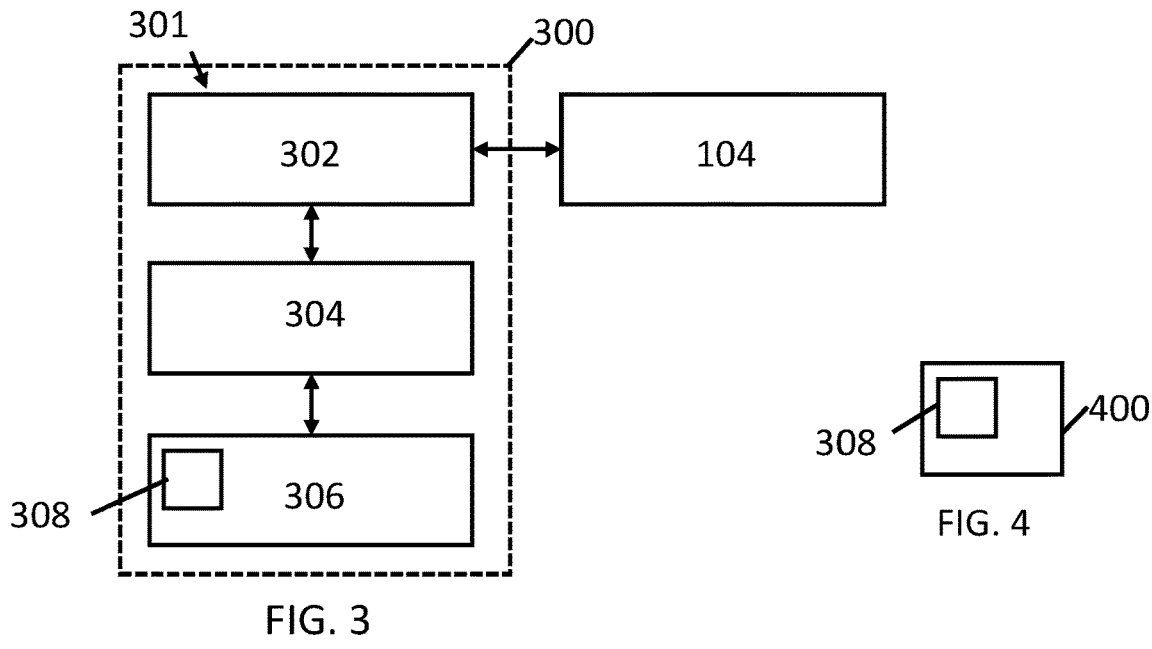
FIG. 3
FIG. 4

WHEEL-TO-SURFACE CONTACT PATCH FORCE VARIATION

TECHNICAL FIELD

The present disclosure relates to controlling wheel-to-surface contact patch force variation. In particular, but not exclusively it relates to controlling wheel-to-surface contact patch force variation by an active suspension system of a vehicle.

BACKGROUND

In scenarios where tractive force at all driven contact patches of a land vehicle is less than the force required to maintain or make progress, the vehicle will be unable to progress at the desired speed.

In scenarios where the tractive force at a driven contact patch exceeds usable traction at that contact patch, wheel slip will occur.

When driving off-road such as on sand, drivers may partially deflate the vehicle's tyres in order to increase the area of the wheel contact patches.

SUMMARY OF THE INVENTION

It is an aim of the present invention to address one or more of the disadvantages associated with the prior art.

According to an aspect of the invention there is provided a control system for controlling an active suspension system of a vehicle, the active suspension system comprising suspension actuators, the control system comprising one or more controller, wherein the control system is configured to: in dependence on an activation signal, provide a control signal to the active suspension system to cause the suspension actuators of the active suspension system to repetitively pulse vertical force through wheels of the vehicle in a controlled pattern determined by the one or more controller, to vary wheel-to-surface contact patch forces, wherein the pattern comprises repetitively pulsing vertical force through at least one of the wheels at a first phase and through at least one other of the wheels at a second phase.

It will be appreciated that the term, wheel-to-surface contact patch, is intended to cover an arrangement where a wheel is fitted with a circumferentially extending tyre and it is the tyre that makes direct contact with the surface on which the vehicle stands.

In some examples, the control system is configured to receive surface information, and in dependence on the surface information: enable the control signal to be provided to the active suspension system; and determine the pattern; and/or determine one or more pulsation characteristics of the pattern.

In some examples, the surface information is dependent on one or more of: a selected terrain mode of the vehicle; or information obtained from one or more sensors.

In some examples, the pattern is configured to: pulse a first pair of the suspension actuators at first diagonally-opposite corners of the vehicle at the first phase, and pulse a second pair of the suspension actuators at second diagonally-opposite corners of the vehicle at the second phase.

In some examples, the second phase is approximately 180 degrees offset from the first phase.

In some examples, the at least one wheel is a first wheel and the at least one other wheel is a second wheel, wherein the pattern is configured to: pulse a suspension actuator of the first wheel at the first phase, wherein the first wheel is at a first lateral side of the vehicle and at a first longitudinal end of the vehicle, pulse a suspension actuator of the second wheel at the second phase, wherein the second wheel is at a second lateral side of the vehicle and at the first longitudinal end, pulse a suspension actuator of a third wheel at a third phase, wherein the third wheel is at the second lateral side and at a second longitudinal end of the vehicle, and pulse a suspension actuator of a fourth wheel at a fourth phase, wherein the fourth wheel is at the first lateral side and at the second longitudinal end.

In some examples, the second phase is approximately 90 degrees behind the first phase, wherein the third phase is approximately 90 degrees behind the second phase, and wherein the fourth phase is approximately 90 degrees behind the third phase.

In some examples, the repetitive pulsing for a given suspension actuator comprises pulsing the vertical force at one or more controlled frequencies determined by the one or more controller.

In some examples, pulsing the vertical force at the one or more frequencies comprises pulsing the vertical force at a plurality of frequencies concurrently.

In some examples, the one or more frequencies comprise a frequency having a value within the range approximately 0.25 Hz to approximately 3 Hz.

In some examples, the one or more frequencies comprise a frequency having a value within the range approximately 8 Hz to approximately 15 Hz.

In some examples, pulsing the vertical force at the one or more predetermined frequencies comprises pulsing the vertical force at a frequency having a value within the range approximately 0.25 Hz to approximately 3 Hz and at a frequency having a value within the range approximately 8 Hz to approximately 15 Hz concurrently.

In some examples, the control system is configured to change pulsation amplitude and/or pulsation frequency in dependence on information from one or more tyre pressure monitors associated with the wheels of the vehicle.

In some examples, pulsation amplitude and/or pulsation frequency for one of the suspension actuators is different from pulsation amplitude and/or pulsation frequency for another of the suspension actuators.

In some examples, the pulsation frequency difference is dependent on different suspension natural frequencies associated with the different suspension actuators, and/or wherein the pulsation amplitude difference for each suspension actuator is dependent on information from tyre pressure monitors.

In some examples, the control system is configured to change a pulsation characteristic of the pattern in dependence on one or more sensed variables associated with vehicle movement.

In some examples, the pulsation characteristic is changed to inhibit low frequency pulsation, in dependence on at least one of the sensed variables falling below a threshold.

In some examples, the pulsation characteristic is changed to increase a pulsation amplitude in dependence on at least one of the sensed variables falling below a threshold.

In some examples, the one or more sensed variables comprise vehicle speed and/or wheel speed.

In some examples, the pulsation characteristic is changed in dependence on vehicle speed falling below a threshold.

In some examples, changing the pulsation characteristic is a nonbinary change.

In some examples, the pattern is a pre-stored pattern that is stored in a memory.

According to a further aspect of the invention there is provided a vehicle comprising the control system.

According to a further aspect of the invention there is provided a method of controlling an active suspension system of a vehicle, the active suspension system comprising suspension actuators, the method comprising: in dependence on an activation signal, providing a control signal to the active suspension system to cause the suspension actuators of the active suspension system to repetitively pulse vertical force through wheels of the vehicle in a controlled pattern determined by one or more controller, to vary wheel-to-surface contact patch forces, wherein the pattern comprises repetitively pulsing vertical force through at least one of the wheels at a first phase and through at least one other of the wheels at a second phase.

According to a further aspect of the invention there is provided computer software that, when executed, is arranged to perform the method. According to a further aspect of the invention there is provided a non-transitory computer readable medium comprising computer readable instructions that, when executed by a processor, cause performance of any one or more of the methods described herein.

The one or more controller may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates an example vehicle and a coordinate system;

FIGS. 2A, 2B illustrate forces acting on a wheel and a road surface, and tractive force;

FIG. 3 illustrates an example control system;

FIG. 4 illustrates an example of a non-transitory computer-readable storage medium;

DETAILED DESCRIPTION

Figure 5:
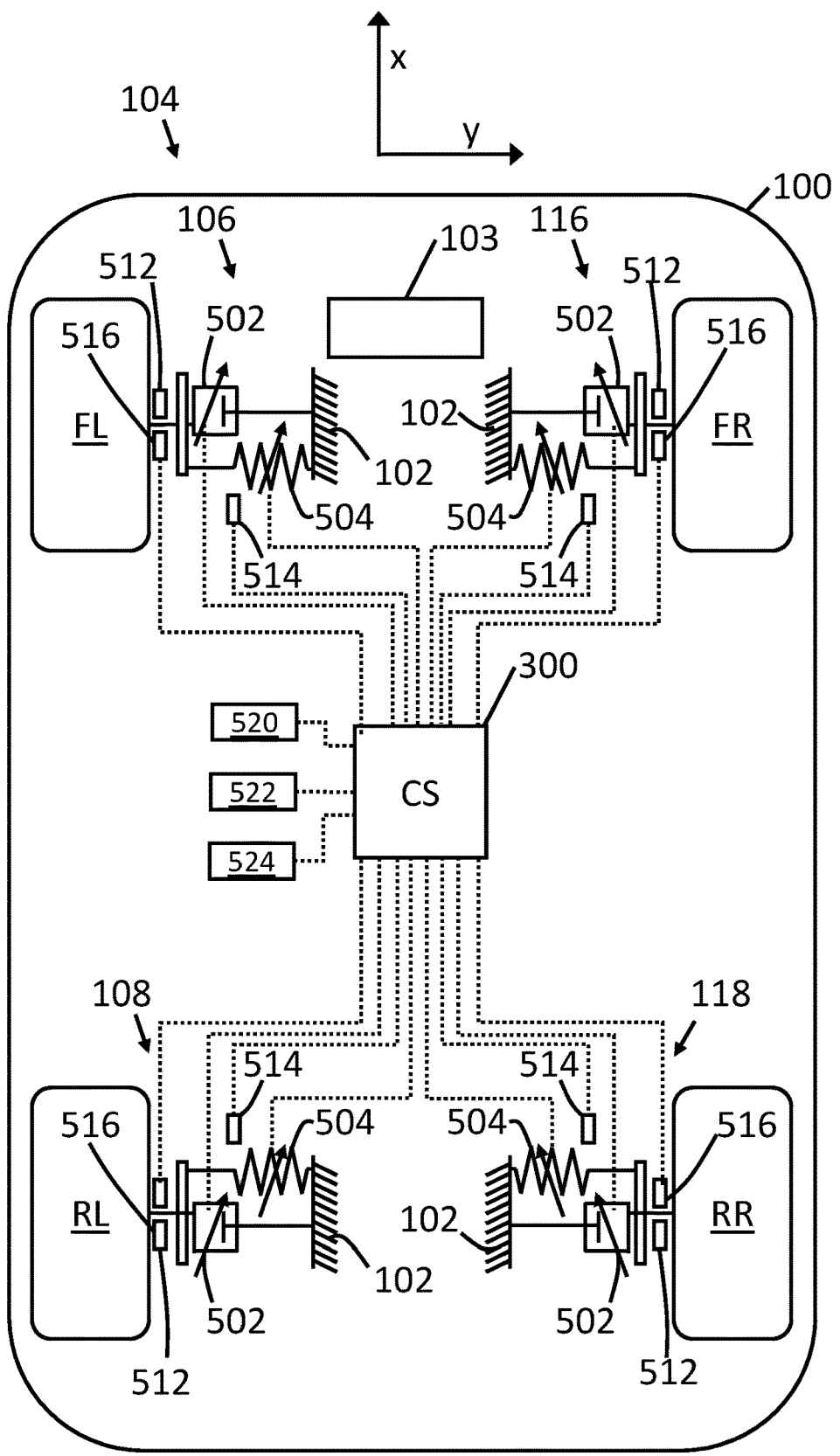
FIG. 5 illustrates an example of an active suspension system of a vehicle.

FIG. 1 illustrates an example of a vehicle 100 in which embodiments of the invention can be implemented. In some, but not necessarily all examples, the vehicle 100 is a passenger vehicle, also referred to as a passenger car or as an automobile. In other examples, embodiments of the invention can be implemented for other applications, such as industrial or commercial vehicles. The vehicle 100 has a vehicle body 102 (sprung mass) supported by a suspension.

FIG. 1 also illustrates a coordinate system. The x-axis is the longitudinal axis. A vehicle body rotation 'R' about the x-axis is roll. The y-axis is the lateral axis. A vehicle body rotation 'P' about the y-axis is pitch. The z-axis is the vertical axis. A vehicle body rotation 'Y' about the z-axis is yaw.

FIG. 2A schematically illustrates a wheel and a road surface, and forces acting on the wheel and on the road. $F_T$ is tractive force which depends on torque Tq applied by a torque source such as an internal combustion engine or electric machine, and depends on usable traction. $F_F$ is friction force. $F_W$ is the weight of the vehicle 100 supported by that wheel, referred to as corner weight if the vehicle 100 has one wheel at each corner. $F_N$ is the normal force equal and opposite to the weight $F_W$. Normal force is also referred to as wheel-to-surface contact patch force herein.

FIG. 2B is a graph with tractive force $F_T$ on the y-axis and applied torque Tq on the x-axis. The solid line in FIG. 2B illustrates for a given normal force $F_{N1}$ the tractive force $F_T$ increases proportionally to applied torque Tq up to a usable traction limit. Above the limit, a further increase of torque Tq will provide less additional tractive force $F_T$ due to onset of wheel slip. With increasing torque and therefore wheel slip rate, the tractive force $F_T$ will start to fall because dynamic friction is less than static friction.

However, if the normal force increases to $F_{N2}$ (dashed line) the usable traction limit increases. Therefore, if the normal force $F_N$ could be increased at least momentarily by increasing the proportion of the vehicle weight applied to that wheel, the consequent increase of usable traction can help the vehicle 100 to maintain traction or get unstuck.

In at least some embodiments of the invention, the suspension of the vehicle 100 is an active suspension system able to momentarily increase the normal force at particular corners (wheels) of the vehicle, to aid vehicle progress. An active suspension system 104 is a system capable of varying the normal force at the wheels of the vehicle. By adding energy to increase actuator force (the force for increasing/decreasing wheel-to-body distance) at a corner of the vehicle 100 relative to other corners, the weight balance of the vehicle 100 shifts so that more of its weight is supported by some wheels than others. If more weight can be applied to driven wheels with highest traction, those wheels will have even more usable traction due to the consequent increases in normal force $F_N$.

An active suspension system 104 and the control system 300 will first be described.

The control system 300 of FIG. 3 comprises a controller 301. In other examples, the control system 300 may comprise a plurality of controllers on-board and/or off-board the vehicle 100. In some examples, a control system 300 or a controller 301 may be supplied as part of an active suspension system 104.

The controller 301 of FIG. 3 includes at least one processor 304; and at least one memory device 306 electrically coupled to the electronic processor 304 and having instructions 308 (e.g. a computer program) stored therein, the at least one memory device 306 and the instructions 308 configured to, with the at least one processor 304, cause any one or more of the methods described 30 herein to be performed. The processor 304 may have an interface 302 such as an electrical input/output I/O or electrical input for receiving information and interacting with external components such as the active suspension system 104.

FIG. 4 illustrates a non-transitory computer-readable storage medium 400 comprising the instructions 308 (computer software).

FIG. 5 illustrates an example implementation of the active suspension system 104.

The active suspension system 104 comprises front left active suspension 106 for a front left wheel FL, front right active suspension 116 for a front right wheel FR, rear left active suspension 108 for a rear left wheel RL, and rear right active suspension 118 for a rear right wheel RR. The active suspension for each wheel (e.g. quarter/corner) of the vehicle 100 may be individually controllable.

FIG. 5 also shows a torque source 103 such as an internal combustion engine or electric machine, for driving at least some of the vehicle wheels.

The active suspension for each corner of the vehicle 100 comprises an actuator 502.

The actuator 502 may be a hydraulic actuator such as a hydraulic fluid-filled chamber containing a piston. One end of the actuator 502 is coupled to a vehicle wheel and the other end is coupled to the vehicle body 102. A spring 504 (e.g. coil or pneumatic) may be in equilibrium and acting in parallel with the actuator 502.

When the vehicle suspension is undisturbed, the piston of the hydraulic actuator 502 sits at a particular neutral position in the chamber.

The piston can move in either direction inside the chamber, e.g. due to a road disturbance compressing the actuator 502. The piston can displace fluid out of the chamber into a hydraulic circuit (not shown). The fluid imparts a restoring force against movement of the piston. Energy can be added to and/or extracted from the actuator 502 by pumping fluid and/or controlling valves to regulate fluid pressure to either side of the piston.

Therefore, a control system 300 can dynamically control restoring force against the displaced piston. This force is equivalent to spring force of a coil spring against displacement. Dynamic control enables the force-displacement relationship to be changed to adapt to a driving scenario. Energy can be added or removed quickly, e.g. within tens of milliseconds. In order to control spring force, the control system 300 may output a force request that is dependent on sensed wheel travel (wheel-to-body displacement/articulation).

Dynamic damping characteristics of the actuator 502 can be modified by controlling a fluid valve at a constriction, which regulates the rate at which fluid is transferred in and out of the actuator 502 by movement of the piston.

Further, energy can be added to or removed from the actuator 502 in order to extend or retract the actuator 502. In FIG. 5 this enables the actuator force to be changed independently at different ends and/or at different corners of the vehicle 100.

The above example refers to a hydraulic actuator 502, and in other embodiments the actuator may be an electromagnetic actuator or a pneumatic actuator, or the like.

In FIG. 5 but not necessarily all examples, the spring 504 comprises an active spring such as a pneumatic spring, enabling control 35 of ride height. The control system 300 may be configured to pump gas (e.g. air) in or out of the pneumatic spring 504 to control ride height. An air-levelling function of the control system 300 seeks to maintain a set ride height irrespective of vehicle load and achieves this by modifying the volume of air and therefore air pressure to maintain the set ride height.

Energy can be added to or removed from the pneumatic spring 504 in order to increase or decrease the volume of the pneumatic spring 504. Increasing the volume can lift the vehicle body 102 in the z-axis. In FIG. 5 this enables the wheel-to-body distance to be changed independently at different ends and/or at different corners of the vehicle 100.

Additionally or alternatively, the spring 504 comprises a passive spring (e.g. coil) or is omitted entirely.

Control of the active suspension system 104 relies on one or more sensors. Wheel travel may be sensed by a wheel-to-body displacement sensor 514 (suspension displacement-based sensor), for example. The wheel-to-body displacement sensor 514 is placed somewhere on the active suspension and can sense the position of the wheel along an arc defined by suspension geometry. An example of a wheel-to-body displacement sensor 514 is a rotary potentiometer attached to a lever, wherein one end of the lever is coupled to the vehicle body 102, and the other end is coupled to a suspension link.

In some examples, the control system 300 more accurately determines the wheel travel and/or its associated derivatives by fusing information from the wheel-to-body displacement sensor 514 with information from wheel hub accelerometers.

Pressure in the pneumatic spring 504 can be sensed to indicate weight onto the wheel.

In at least some examples the control system 300 is configured to control the active suspension system 104 by transmitting a force request to the active suspension or to a low-level controller thereof. The force request may be an arbitrated force request based on requests from various requestors and information from various sensors.

FIG. 5 illustrates additional optional features that may interact with the control system 300 to influence force request calculation. These include any one or more of:

- A wheel speed sensor 512 for each wheel. In an example implementation, the wheel speed sensor 512 is part of an antilock 25 braking system (ABS).
- A hub-mounted accelerometer 516 for each wheel, coupled to the unsprung mass of the vehicle 100.
- A human-machine interface (HMI) 520. This refers to any of the various input devices and input/output devices available to the driver such as touchscreens, displays, hardware switches/sliders/selectors or the like.
- At least one vehicle body accelerometer 522 coupled to the vehicle body 102 (sprung mass). A particular example includes a 3DOF or 6DOF inertial measurement unit (IMU). A unit may comprise an accelerometer or a multi-axis set of accelerometers.
- A tyre pressure monitoring system (TPMS) 524 comprising tyre pressure monitors for each wheel.

Examples of controlling the active suspension system 104 to momentarily increase traction are now explained with reference to examples shown in FIGS. 6A-8E.

Figure 6A:
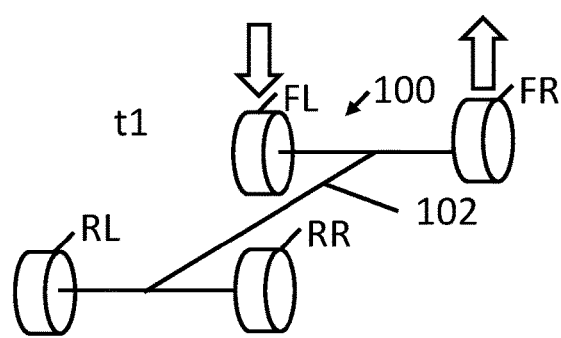
FIGS. 6A, 6B, 6C illustrate an example of out-of-phase contact patch force variation across an axle.
Figure 6B:
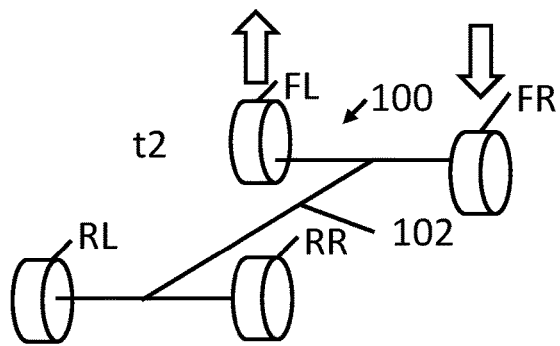
Figure 6C:
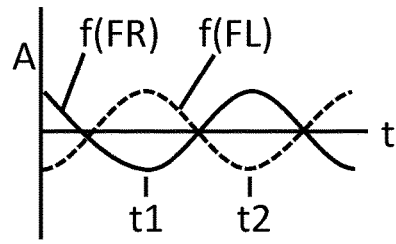

FIGS. 6A-6C illustrate a first embodiment. FIGS. 6A, 6B are schematic illustrations of the vehicle wheels FL, FR, RL, RR and vehicle body 102 at different times. In the first embodiment, the active suspension system 104 repetitively pulses vertical force through a subset of wheels of the vehicle 100 in a controlled pattern to vary wheel-to-surface contact patch forces.

The vertical force refers to normal force. That is, the proportion of the vehicle weight supported by each wheel of the vehicle 100 is modulated. This is achievable by varying the force applied to each wheel by their respective actuator 502, effectively repeatedly extending and retracting the actuators 502.

In the case of FIG. 6A, one of the wheels (e.g. front wheel FR) is pulsed at a first phase and another lateral wheel FL at the same longitudinal end of the vehicle 100 is pulsed at a second phase, in this case approximately 180 degrees out of phase. Therefore, one wheel is lifted upward (unweighted) while the other wheel is pushed downward (weighted).

FIG. 6A illustrates the state of the wheels at a first time t1, wherein the front right wheel FR is pulled upwards as shown by the up arrow to decrease normal force for the front right wheel FR and the front left wheel FL is pushed downwards as shown by the down arrow to increase normal force for the front left wheel FL.

FIG. 6B illustrates the state of the wheels at a second time t2, 180 degrees after the first time, wherein the front right wheel FR is pushed downwards and the front left wheel FL is pulled upwards. It will be appreciated that whilst force is varied by the actuators 502, it is still desirable in many situations, to maintain tyre to surface contact at all corners. As such, the wheel-to-body displacement changes can be relatively small, which is advantageous as it tends not to cause uncomfortable disturbances in vehicle body motion.

In the first embodiment of FIG. 6A but not necessarily all examples the other wheels RL, RR at the other longitudinal end of the vehicle 100 are not pulsed. This ensures that the pulsation does not impart a rocking motion in the roll axis. In a variation of the first embodiment the rear wheels RL, RR are pulsed but not the front wheels FL, FR, for instance if the vehicle 100 is configured for rear-wheel drive.

In at least some examples the controlled pattern is determined by the one or more controller. That is, at least part of the controlled pattern comprises a predetermined pattern. A predetermined pattern is a pattern prestored into the memory 306 from the factory, that is calibrated to improve traction.

Optionally pseudorandom relatively high frequency noise (dither) could be added to the pattern, for example to mask the pattern to make it less perceptible to occupants.

In some examples the pattern comprises a controlled time-varying pattern. In other examples the pattern comprises a controlled spatially-varying pattern, however a time-varying pattern is applicable to more use cases as it is independent of vehicle speed.

In at least some examples the pattern is an oscillating pattern as shown in the amplitude (A)-time (t) graph of FIG. 6C. In FIG. 6C the pattern is sinusoidal for smoothness. In other examples the waveform is different or is a sequence of discontinuous pulses.

In some examples the pattern has a predetermined frequency. FIG. 6C shows that one wheel FR is pulsed at a first frequency f(FR) and the other wheel is pulsed at a frequency f(FL) which is the same as the first frequency. However, it would be appreciated that the frequencies do not have to match.

FIG. 6C also shows that the waveforms are 180 degrees out of phase, so one wheel is at maximum loading/weighting while the other wheel is at maximum unloading/unweighting.

In an example the frequency (first frequency) is at least approximately 0.25 Hz. The frequency is no more than approximately 3 Hz. This low frequency oscillation, as opposed to a high frequency oscillation helps the vehicle 100 to maintain momentum and limit wheel slip.

In one example the frequency remains constant. In another example the frequency is swept between a first value and a second value within the above range to help find an optimum.

The appropriate amplitude of oscillation is another parameter that can be controlled. At least if the vehicle 100 is moving, the frequency and amplitude may be controlled to be below a range that could otherwise induce wheel hop. Therefore, the wheels remain in continuous contact with the ground.

If the vehicle 100 is stuck in a particulate surface (e.g. sand) or snow, a different frequency and/or amplitude may be appropriate.

Inducement of wheel hop can help loose particles to flow under the vehicle wheels, particularly when combined with some degree of wheel spin. The appropriate frequency in such circumstances is a wheel hop frequency between approximately 8 Hz and approximately 15 Hz. The best results are from 8 Hz to 12 Hz.

On particulate surfaces, even if the vehicle 100 is not stuck vehicle progress can be aided by superimposing different frequencies concurrently. The above-mentioned low frequency and high frequency could be superimposed. The force request amplitude for the high frequency oscillation may be less than the force request for the low frequency oscillation, for example less than half. The high frequency pulsation could act as a form of dither (noise) as described earlier. The high frequency pulsation may or may not be out-of-phase across the pulsed wheels.

A pneumatic spring 504 is unsuitable to oscillate within the frequency range because of their slower response times and their thermal duties, therefore, the actuator 502 is used.

Figure 7A:
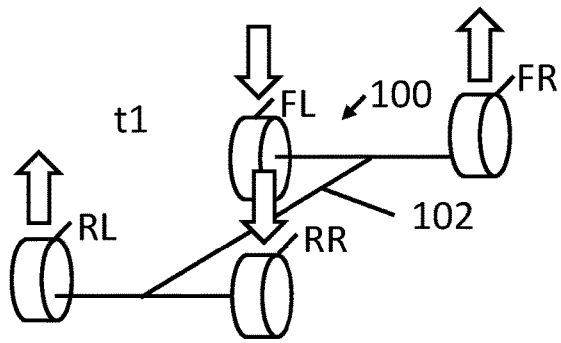
FIGS. 7A, 7B, 7C illustrate an example of diagonal out-of-phase contact patch force variation across a vehicle.
Figure 7B:
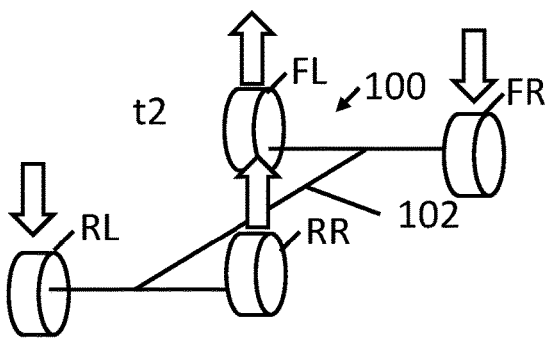
Figure 7C:
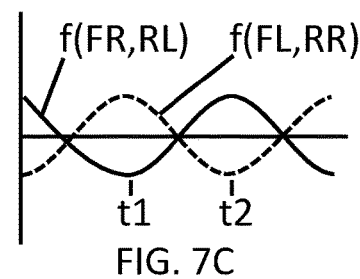

FIGS. 7A-7C illustrate a second embodiment similar to the first embodiment except more (e.g. all) driven wheels are pulsed. This is useful if the vehicle 100 is configured for multi-axle drive (e.g. all-wheel drive), in which wheels at both longitudinal ends of the vehicle 100 are driven wheels. In this example, a first pair of actuators 502 at first diagonally-opposite corners of the vehicle 100 are pulsed at the first phase, and a second pair of actuators 502 at second diagonally-opposite corners of the vehicle 100 are pulsed at the second phase.

FIG. 7A illustrates the state of the wheels at a first time t1, wherein the front right wheel FR and rear left wheel FL are pulled upwards as a diagonal pair while the front left wheel FL and rear right wheel RR are pushed downwards as a diagonal pair.

FIG. 7B illustrates the state of the wheels at a second time t2, 180 degrees after the first time, wherein the front right wheel FR and rear left wheel FL are pushed downwards as a diagonal pair while the front left wheel FL and rear right wheel RR are pulled upwards as a diagonal pair.

FIG. 7C shows amplitude against time. In some examples the frequency/frequencies of the first diagonal pair of wheels f(FR, RR) approximately matches the frequency/frequencies of the second diagonal pair of wheels f(FL,RR), and the waveforms are approximately 180 degrees out of phase.

The selection of diagonal pairs and a 180-degree phase offset together help to maintain vehicle body composure, so that vehicle body motion is neither pure roll nor pure pitch.

An alternative implementation of FIGS. 7A-7C is to push a first diagonal pair of wheels without pulling the other pair, and then push the other pair of wheels without pulling the first pair. That is, the wheels are pushed consecutively rather than concurrently.

FIGS. 8A-8E illustrate a third embodiment in which individual wheels are pulsed in a rotating gimballing pattern or sequence, either clockwise or anticlockwise around the vehicle.

Figure 8A:
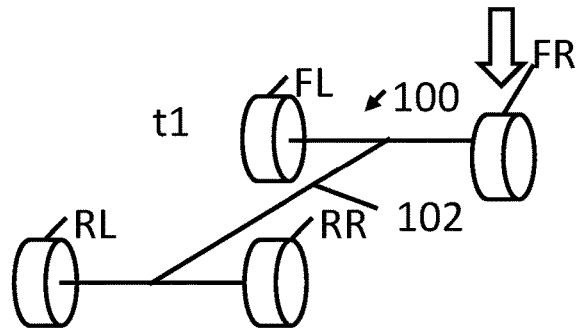
FIGS. 8A, 8B, 8C, 8D, 8E illustrate an example of 90-degree out-of-phase contact patch force variation around a vehicle.

In FIG. 8A at time t1 a first wheel FR is pulsed at a first phase, wherein the first wheel is at a first lateral side (right) of the vehicle 100 and at a first longitudinal end (front) of the vehicle 100.

Figure 8B:
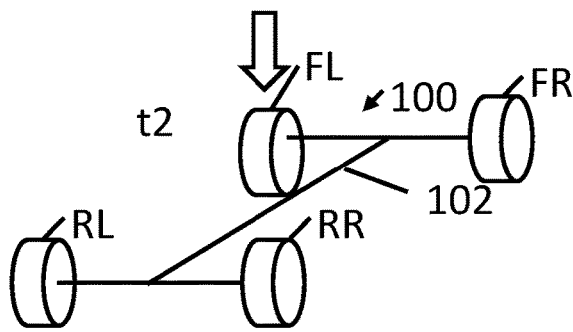

In FIG. 8B at time t2 a second wheel FL is pulsed at a second phase behind the first phase, wherein the second wheel is at a second lateral side (left) of the vehicle 100 and at the first longitudinal end (front).

Figure 8C:
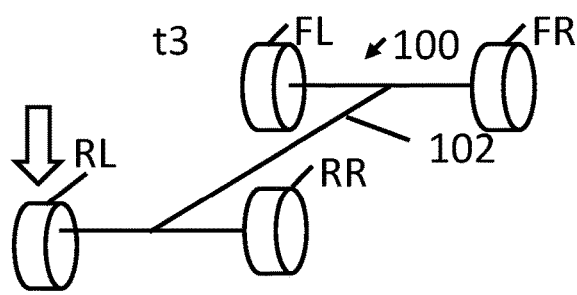

In FIG. 8C at time t3 a third wheel RL is pulsed at a third phase behind the second phase, wherein the third wheel is at the second 25 lateral side (left) and at a second longitudinal end (rear) of the vehicle 100.

Figure 8D:
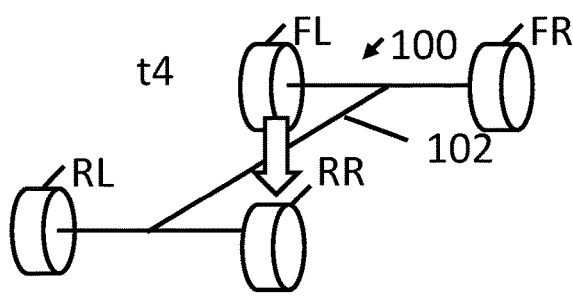

In FIG. 8D at time t4 a fourth wheel RR is pulsed at a fourth phase behind the third phase, wherein the fourth wheel is at the first lateral side (right) and at the second longitudinal end (rear).

As shown in FIG. 8D, the first to fourth phases may be approximately 90 degrees behind each other to provide uniformly rotating contact patch force variation around the vehicle, producing a controlled gimballing motion of the vehicle. The frequencies f(FR), f(FL), f(RL), f(RR) may be approximately the same frequency or frequencies as each other.

This gimballing motion helps to maintain vehicle body composure, so that vehicle body motion is neither pure roll nor pure pitch.

In FIGS. 8A-8E, but not necessarily all examples, the non-pushed wheels are not pulled and maintain their neutral undeflected positions.

Figure 9:
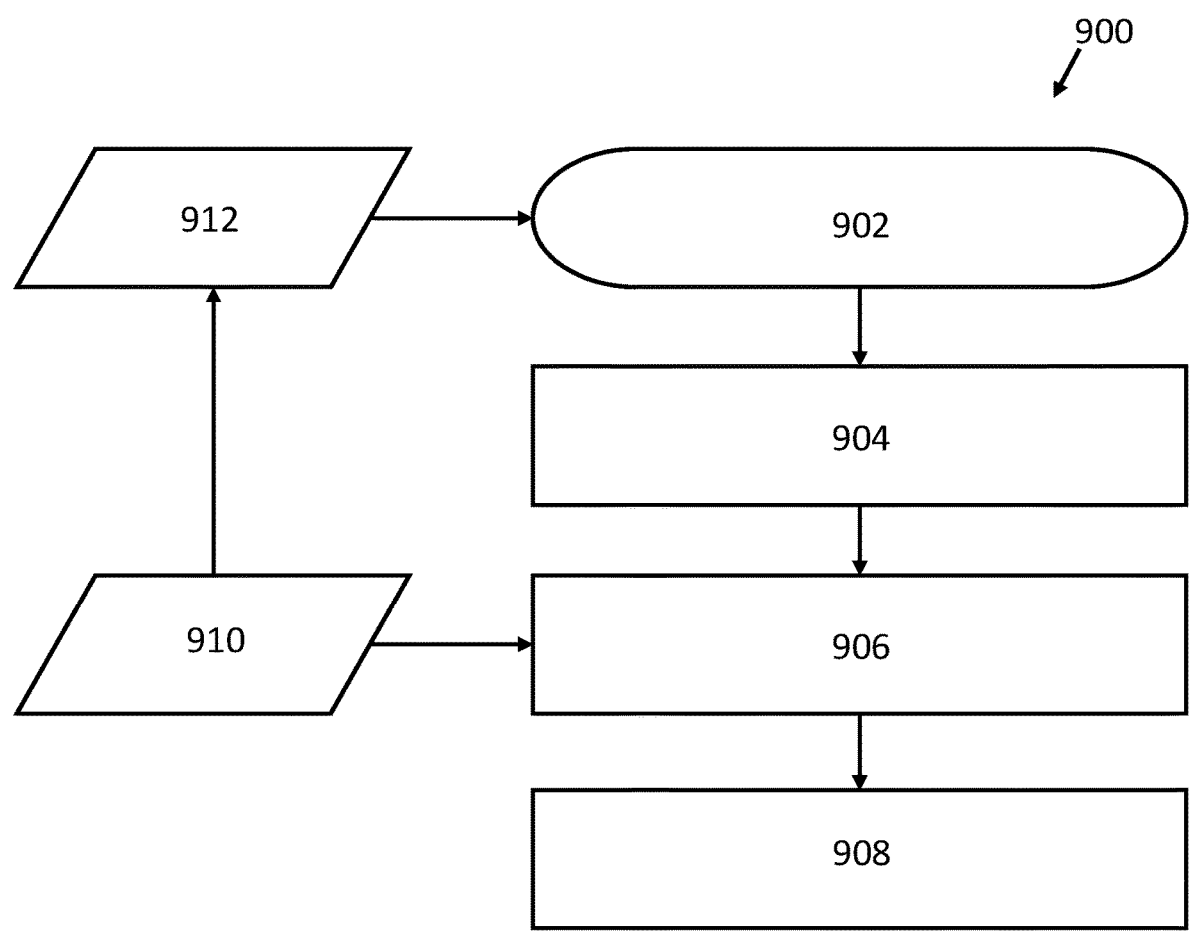
FIG. 9 illustrates an example method.

FIG. 9 is a flowchart illustrating an example control method 900 for contact patch force variation, implemented by the control system. In the present example the pattern is manually triggered. However, in other examples the pattern could be automatically triggered.

The method 900 starts at operation 902 in which the method 900 is enabled. For example, an HMI 520 for manually triggering the pattern is enabled.

Enabling the method 900 may optionally require that one or more inhibit conditions are not active, such as at least one of: a vehicle stability system intervention inhibit condition; an anti-lock braking intervention inhibit condition; a park brake engaged inhibit condition; or a handbrake engaged condition.

A further example inhibit condition is that vehicle speed is above a threshold. The method 900 could require that vehicle speed over ground is below a threshold value, the threshold having a value from the range 5 metres per second to 20 metres per second, e.g. 15 metres per second. Other speed ranges are useful.

A blend function associated with the speed-based inhibit condition could allow the amplitudes of the force requests to increase as vehicle speed falls and could decrease the amplitudes as vehicle speed rises, to avoid noticeable binary behaviour. The blend function can have the threshold value as its upper limit and can have a lower limit speed below which the method 900 is fully enabled. In an example, the lower limit is between 1 metre per second and 10 metres per second slower than the upper limit.

Another example inhibit condition checks surface information from data block 912. The surface information may comprise a selected terrain mode and/or information from one or more sensors from data block 910. Terrain modes are defined at the end of the specification. In an example the method 900 may determine whether the vehicle 100 is in a first terrain mode or a second terrain mode. If the vehicle 100 is in a first terrain mode the method 900 does not proceed. If the vehicle 100 is in a second terrain mode the method 900 proceeds. In one embodiment the first terrain mode is an on-road/high-traction mode and the second terrain mode is an off-road/low-traction mode.

The method 900 can either be enabled for automatic activation as long as inhibit conditions are not satisfied, or can be enabled for manual activation via an HMI 520 or a manual mode/terrain mode selection as long as inhibit conditions are not satisfied.

At operation 904, an activation signal received. For manual activation, the activation signal may be a user activation signal. The user activation signal may indicate user actuation of a HMI 520. If an HMI was used in operation 902, this HMI may be different—for example, activation may be a feature within a particular terrain mode.

For automatic activation, loss of traction may act as a suitable activation trigger. Detected loss of traction is possible using data 35 from wheel speed sensors 512 and/or wheel hub accelerometers 516, for example.

At operation 906 the characteristics of the pulsation pattern are determined. This optional operation is useful if one or more characteristics are to be calculated based on contextual information such as sensor information from data block 910.

A first aspect of operation 906 is global characteristics of the pulsation pattern. This governs a common amplitude and frequency target for all wheels.

As described earlier, the control system could optionally discriminate between a stuck vehicle and a vehicle 100 that is not stuck. As discussed, a stuck vehicle 100 may benefit from a higher wheel hop frequency, and a low frequency or both frequencies are suitable for moving vehicles. Sensed variables associated with vehicle movement can aid this determination. An example of a sensed variable is vehicle speed falling below a requested value (e.g. setpoint). The vehicle 100 is determined to be stuck when vehicle speed and/or wheel speed falls below a threshold despite a torque request (e.g. torque request above a threshold). In some examples, detected loss of traction (wheel spin) or stick-slip based on wheel speed combined with the low vehicle speed could provide confidence that the vehicle 100 is stuck.

A blend function could be implemented to provide a nonbinary transition (e.g. smooth/stepped) between a stuck vehicle strategy and a non-stuck vehicle strategy. Therefore, a strategy change is less perceptible to vehicle occupants. Additionally or alternatively, hysteresis could be implemented for the strategy changes.

As described earlier, different terrain modes may benefit from different frequencies. For example, a sand-related terrain mode could benefit from multiple superimposed frequencies (0.25-3 Hz and 8-15 Hz) as described earlier, whereas another terrain mode associated with hard surfaces may benefit from only the low frequency (0.25-3 Hz).

A second aspect of operation 906 is local characteristics of the force request for individual corners, to compensate for differences in suspension characteristics.

The suspensions of individual corners have a natural frequency which depends on the stiffnesses of deformable elements such as actuators 502, springs and tyres, and also depends on the sprung mass onto the wheel which varies between corners. While left-to-right differences may be minimal, front-to-rear differences may exist. The rear suspension may have a higher frequency than front suspension, for improving vehicle body composure at speed.

Therefore, the force request to each corner may require a force request frequency not necessarily matching the natural frequency of each corner, to ensure that the resulting frequency of pulsation from the wheel perspective is the same at different corners of the vehicle 100.

Accordingly, one or more variables may be taken into account when determining the force requests for individual corners (individual actuators 502).

Figure 8E:
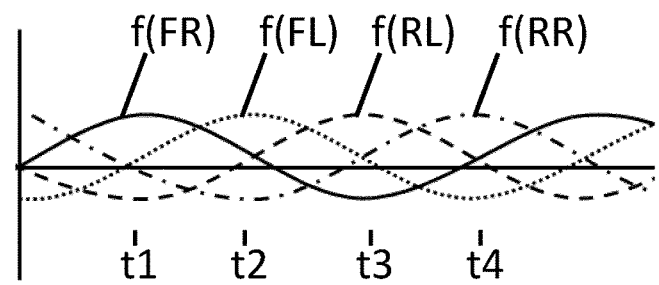

Firstly, tyre pressure monitoring data from the TPMS 524 could be employed, to account for any deflation of the tyres and resulting reduction of natural frequency. This is useful in case the driver has let some air out of their tyres to aid progress. Tyre pressure indications for each tyre may be received by the control system. A tyre pressure gain function may compensate for differences in tyre pressure between different tyres, to ensure the resulting waveforms are as shown in FIG. 6C, 7C or 8E.

Secondly, sprung mass could be measured for a given corner. One method of measuring sprung mass is to measure steady-state pneumatic pressure/hydraulic pressure in the actuator 502 or spring 504, which is a function of weight.

Thirdly, as wheel rate may be affected by ride height, a ride height-dependent parameter may be taken into account. In an example, the ride height-dependent parameter comprises a requested ride height or measured ride height (e.g. measured by wheel-to-body displacement sensors 514).

Then, at operation 908 the pattern is implemented by outputting force requests to the relevant suspension actuators 502. Examples of the pattern as provided earlier and shown in FIGS. 6A to 8D. An example may comprise repetitively pulsing vertical force through wheels at different phases.

Operation 908 may terminate when manually deactivated via an HMI 520 or after a predetermined time.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controller may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

Terrain modes are defined. Different terrain modes control one or more vehicle subsystems according to different sets of configurations. A terrain mode generally refers to vehicle modes optimized for driving over particular driving surfaces. An example of a terrain mode is an off-road terrain mode, arranged to optimize the vehicle for driving over off-road terrain such as may be required when traversing areas of grass, gravel, sand, mud or even crawling over rocks. Another example of a terrain mode is a surface vehicle optimization mode, arranged to optimize the vehicle for driving over low friction surfaces such as snow or ice covered surfaces, either on or off road. A vehicle may comprise a base on-road/high-traction mode and/or a base surface vehicle optimization mode for regular surfaces, and may comprise a plurality of terrain modes for various surfaces and/or terrain.

A terrain mode and/or detection of a particular terrain type may configure one or more surface traction-related configurations such as a differential locking setting and/or a traction control setting. Additionally, or alternatively, other configurations could be adjusted such as: a suspension setting; a ride height setting; a suspension damper setting; a throttle response setting; a gear shift point setting; a high/low transfer ratio setting; a vehicle braking or traction control setting; a torque distribution setting; a locking/lockable differential setting; a torque shaping setting; or a steering weighting or assistance setting. The configurations may be predetermined or reconfigurable.

A manual user selection may comprise use of a human-machine interface input device 520. In some examples, a terrain mode may be changeable automatically.

One example HMI 520 is a terrain mode selector. In some embodiments, the terrain mode selector may be configured to allow a user to provide surface information by selecting from one a plurality of terrain modes including at least some of: sand; rock-crawl; grass-gravel-snow; mud-ruts; general (base mode).

In some embodiments, the terrain mode selector may be configured to allow a user to select an 'automatic' or 'auto' mode in which the vehicle, for example at control system 300, determines the most appropriate terrain mode at a given moment in time. This is achieved by obtaining from one or more sensors surface information including at least some of: rolling resistance; terrain roughness; gradient; wheel slip; wheel articulation; vehicle yaw. Suitable sensors include IMUs/accelerometers 522; 516, wheel speed sensors 512 or the like.

It will be appreciated that various changes and modifications can be made to the present invention without departing from the scope of the present application.

The blocks illustrated in FIG. 9 may represent steps in a method and/or sections of code in the computer program 308. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system for controlling an active suspension system of a vehicle, the active suspension system comprising suspension actuators, the control system comprising at least one controller, wherein the control system is configured to:
   in dependence on an activation signal, provide a control signal to the active suspension system to cause the suspension actuators of the active suspension system to repetitively pulse vertical force through wheels of the vehicle in a controlled pattern determined by the at least one controller, to vary wheel-to-surface contact patch forces,
   wherein the pattern comprises repetitively pulsing vertical force through at least one of the wheels at a first phase and through at least one other of the wheels at a second phase.

2. The control system of claim 1, wherein the control system is configured to receive surface information, and in dependence on the surface information:
   enable the control signal to be provided to the active suspension system; and
   determine the pattern; and/or
   determine one or more pulsation characteristics of the pattern.

3. The control system of claim 2, wherein the surface information is dependent on one or more of: a selected terrain mode of the vehicle, and information obtained from one or more sensors.

4. The control system of claim 1, wherein the pattern is configured to:
   pulse a first set of the suspension actuators at first diagonally-opposite corners of the vehicle at the first phase, and
   pulse a second set of the suspension actuators at second diagonally-opposite corners of the vehicle at the second phase.

5. The control system of claim 1, wherein the second phase is approximately 180 degrees offset from the first phase.

6. The control system of claim 1, wherein
   the at least one wheel is a first wheel;
   the first wheel is at a first lateral side of the vehicle and at a first longitudinal end of the vehicle;
   the at least one other wheel is a second wheel; the second wheel is at a second lateral side of the vehicle and at the first longitudinal end of the vehicle; and
   the pattern is configured to:
      pulse a suspension actuator of the first wheel at the first phase,
      pulse a suspension actuator of the second wheel at the second phase,
      pulse a suspension actuator of a third wheel at a third phase, wherein the third wheel is at the second lateral side and at a second longitudinal end of the vehicle; and
      pulse a suspension actuator of a fourth wheel at a fourth phase, wherein the fourth wheel is at the first lateral side and at the second longitudinal end.

7. The control system of claim 1, wherein the repetitive pulsing for a given suspension actuator comprises
   pulsing the vertical force at one or more controlled frequencies determined by the at least one controller; or
   pulsing the vertical force at a plurality of frequencies concurrently.

8. The control system of claim 7, wherein the one or more frequencies comprise a frequency having a value within a range from approximately 0.25 Hz to approximately 3 Hz.

9. The control system of claim 7, wherein the one or more frequencies comprise a frequency having a value within a range from approximately 8 Hz to approximately 15 Hz.

10. The control system of claim 1, wherein the control system is configured to change at least one of a pulsation amplitude and a pulsation frequency in dependence on information from one or more tire pressure monitors associated with the wheels of the vehicle.

11. The control system of claim 1, wherein
    a pulsation characteristic for one of the suspension actuators is different from the pulsation characteristic for another of the suspension actuators; and
    the pulsation characteristic is at least one of a pulsation amplitude and a pulsation frequency.

12. The control system of claim 11, wherein
    the pulsation frequency is different in dependence on a suspension natural frequency associated with the one of the suspension actuators being different from the suspension natural frequency of the another of the suspension actuators, or
    the pulsation amplitude is different in dependence on information from tire pressure monitors associated with the wheels of the vehicle associated with the one of the suspension actuators and the another of the suspension actuators, respectively.

13. The control system of claim 1, wherein the control system is configured to change a pulsation characteristic of the pattern in dependence on one or more sensed variables associated with vehicle movement.

14. The control system of claim 13, wherein the pulsation characteristic is changed to inhibit low frequency pulsation, in dependence on at least one of the sensed variables falling below a threshold.

15. The control system of claim 14, wherein the pulsation characteristic is changed to increase a pulsation amplitude in dependence on at least one of the sensed variables falling below a threshold.

16. The control system of claim 14, wherein the at least one sensed variable comprises at least one of vehicle speed and wheel speed.

17. The control system of claim 14, wherein
    changing the pulsation characteristic is a nonbinary change; or the pattern is a pre-stored pattern that is stored in a memory.

18. A vehicle comprising the control system of claim 1.

19. A method of controlling an active suspension system of a vehicle, the active suspension system comprising suspension actuators, the method comprising:
- in dependence on an activation signal, providing a control signal to the active suspension system to cause the suspension actuators of the active suspension system to repetitively pulse vertical force through wheels of the vehicle in a controlled pattern determined by at least one controller, to vary wheel-to-surface contact patch forces,
- wherein the pattern comprises repetitively pulsing vertical force through at least one of the wheels at a first phase and through at least one other of the wheels at a second phase.

20. A non-transitory storage medium containing instructions that, when executed by at least one processor, cause the processor to perform the method of claim 19.

* * * * *